July 24, 1962
R. W. THOMAS
3,045,972
STAGE CAR TURNTABLE
Filed Sept. 26, 1957
3 Sheets-Sheet 1
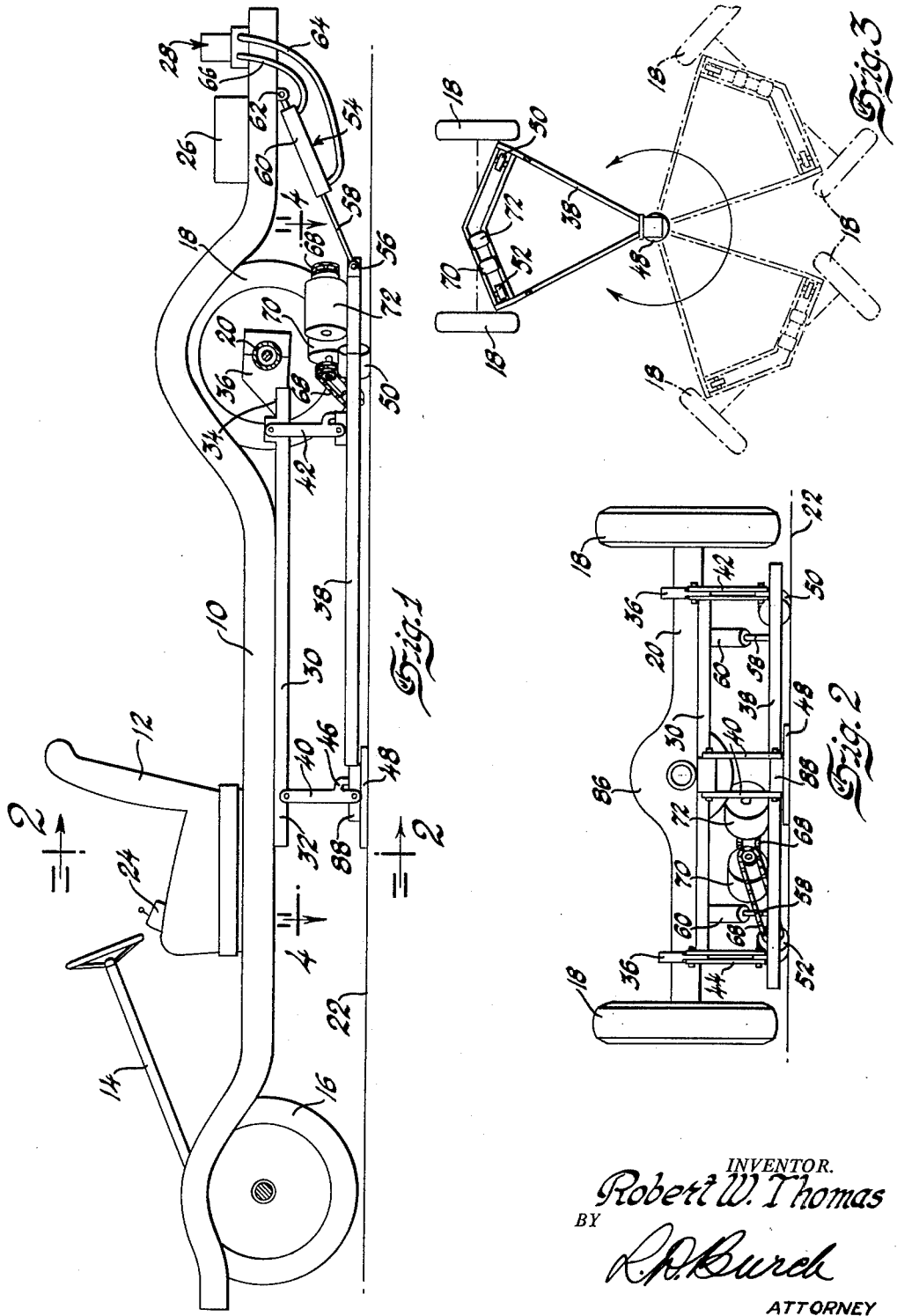
INVENTOR.
Robert W. Thomas
BY
R. A. Burch
ATTORNEY

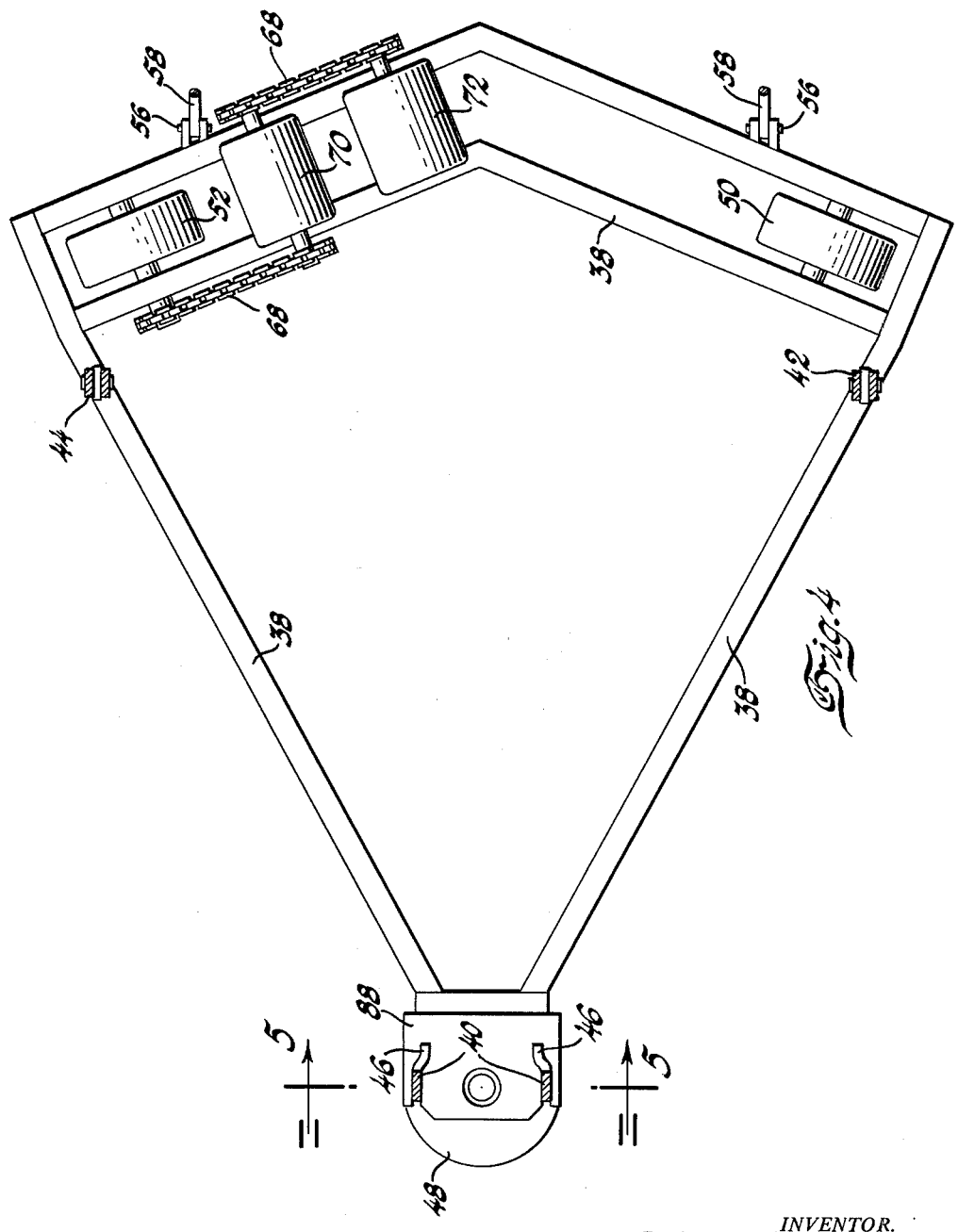

July 24, 1962  R. W. THOMAS  3,045,972
STAGE CAR TURNTABLE
Filed Sept. 26, 1957  3 Sheets-Sheet 3

INVENTOR.
Robert W. Thomas
BY
L.D. Burek
ATTORNEY 3,045,972
STAGE CAR TURNTABLE
Robert W. Thomas, St. Clair Shores, Mich., assignor to General Motors Corporation, Detroit, Mich., a corporation of Delaware
Filed Sept. 26, 1957, Ser. No. 686,394
1 Claim. (Cl. 254—87)

The invention relates to a turntable and more particularly to a turntable which may be used to display heavy portable objects. As illustrated, the turntable is attached to an automotive vehicle. The vehicle supports the turntable when the turntable is not in use and is in turn supported by the turntable when it is desired to display all sides of the vehicle to an audience. The power unit for operating the turntable is contained within the vehicle and no outside power supply is required. The turntable may be operated by the vehicle operator. When not in use, the turntable is secured underneath the vehicle so as to be substantially out of view of the audience. At the same time it will not interfere with the vehicle operation. By employing the invention, the showing of such objects as automotive vehicles is no longer restricted to stages having turntables installed as a portion of the stage floor since each vehicle to be displayed is provided with its own turntable.

In the drawings:

FIGURE 1 is a side view of a vehicle chassis having secured thereto a turntable embodying the invention and shown in its down position;

FIGURE 2 is a view taken in the direction of arrows 2—2 of FIGURE 1;

FIGURE 3 is a plane view of the turntable of FIGURE 1 showing the turntable in various rotated positions;

FIGURE 4 is an enlarged plane view of the turntable of FIGURE 1;

Figure 5:
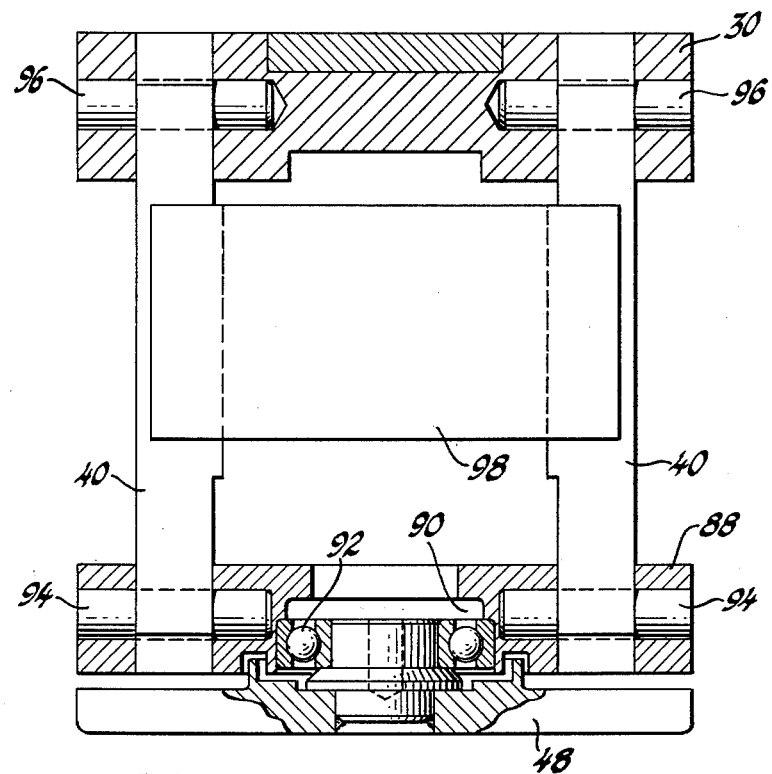
FIGURE 5 is a cross section view of the turntable pivot support taken in the direction of arrows 5—5 of FIGURE 4.

The portions of the vehicle illustrated in FIGURE 1 include a chassis 10, a seat 12, steering mechanism 14, front wheel 16, rear wheels 18, and rear axle housing 20. The turntable is shown in its down position, at which time the wheels 16 and 18 are lifted off the floor or other surface 22.

A control 24 is provided for the convenience of the vehicle operator in the driver's compartment. Batteries 26 may be mounted in the trunk space of the vehicle to provide motive power for the turntable. The batteries may also provide driving power for the vehicle if desired. Batteries 26 are connected with an electric motor and hydraulic power system 28 to operate the hydraulic portion of the turntable.

The turntable includes an upper frame 30 which is secured to the chassis 10 at its forward end 32 and to the rear axle housing at its rear end 34. Any suitable clamping means 36 may be utilized to clamp frame 30 to the rear axle housing. Frame 30 may be generally triangular in shape as shown in FIGURES 3 and 4.

A lower frame 38 of the same general shape as upper frame 30 is pivotally attached to frame 30 so that it may be held in a raised position immediately underneath frame 30 or may be lowered as shown in FIGURE 1. Pivot links 40, 42, and 44 are provided to attach frame 38 to frame 30. These links may be provided with mechanical stops 46 which engage blocks on frame 38 and prevent the frame from being pivoted downwardly beyond a predetermined point. The pivot links are attached to frames 30 and 38 at the three corners thereof.

Frame 38 has a pad 48 attached to the forward apex of the triangle underneath pivot link 40. This pad is provided with bearings so that when the pad is in engagement with surface 22, frame 38 may be rotated in a horizontal plane without moving the pad. Details of this construction are shown in FIGURE 5 and will be later described. Pivot wheels 50 and 52 are positioned adjacent the rear corners of triangular frame 38 so that they are in rolling contact with surface 22 when the frame is in the lowered position.

Frame 38 is raised and lowered by hydraulic power. A pair of hydraulic motors 54 are provided for this purpose. One motor is pivotally attached at 56 to either rear corner of frame 38. The portions of motors 54 attached to frame 38 may be either the cylinder or rod portions. Motor piston rods 58 are illustrated as being attached to frame 38. Cylinders 60 of motors 54 are pivotally attached to chassis 10 at points 62. Hydraulic lines 64 and 66 connect the hydraulic power system 28 with motors 54. Suitable control units may be used in the electrical motor and hydraulic power system to maintain the position of the power pistons within the motors at any desired position. Such control units are commercially available and need not be described in detail.

When motors 54 are fully retracted, frame 38 is pivoted rearwardly and is positioned directly underneath frame 30. When motors 54 are extended as shown in FIGURE 1, frame 38 is pivoted downwardly and forwardly relative to frame 30 until pad 48 and wheels 50 and 52 engage surface 22. The same relative movement continues; however, the vehicle is now moved relative to surface 22. It is moved slightly upward and in a rearward direction until wheels 16 and 18 no longer contact surface 22. The entire vehicle is then supported by pivot pad 48 and pivot wheels 50 and 52.

One of the pivot wheels associated with frame 38 is connected through appropriate drive mechanisms such as chains 68 and gear reducer 70 to be driven by an electric motor 72. Control 24 may be connected to energize and de-energize motor 72. Batteries 26 may provide the necessary electrical power for motor 72 as well as for the electro-hydraulic system 28.

Figure 6:
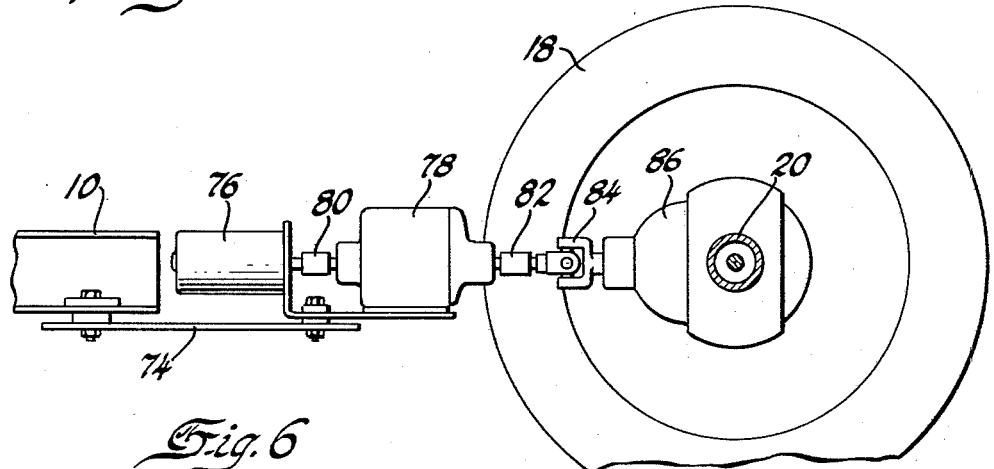
FIGURE 6 is a view of the vehicle drive mechanism which may be used in conjunction with the turntable.

Since it is often undesirable in the relatively confined spaces available for displaying vehicles to power the vehicle by an internal combustion engine, an electrical drive may be used for this purpose. Such a drive eliminates the problem of atmosphere contamination by exhaust gases. FIGURE 6 shows a drive mechanism of this type. A support 74 may be secured to chassis 10 and have mounted thereon an electric motor 76 and a gear reducer 78. Motor 76 may be of the type commercially used as starting motors for vehicles. This motor is connected to gear reducer 78 through appropriate shafting 80. Gear reducer 78 is in turn connected through shafting 82 and universal joint 84 to the differential gear mechanism within the differential housing 86. Control 24 may also have connections which energize motor 76 to cause the motor to be rotated in the desired direction, thereby driving the vehicle either forwardly or reversely as desired. Batteries 26 may also provide electrical power for this purpose.

The pivot mechanism located at the forward apex of the triangular frame 38 is shown in detail in FIGURE 5. This mechanism includes a block 88 which is connected to frame 38 and has a bearing rest 90 formed thereon to receive bearing 92. This bearing may be of any suitable type and is illustrated as being a ball bearing although other bearings such as roller bearings may be used. Pivot pad 48 is also connected with bearing 92 and is spaced from block 88 so that the pad and block may be freely rotated relative to each other. Pivot links 40 are connected to block 88 through pins 94 and to frame 30 by pins 96. A crosspiece 98 may be provided on links 40 to strengthen them and may also operate as a mechanical stop engageable with a portion of frame 30 to prevent pivotal movement of the lower frame 38 beyond a predetermined point.

The drive mechanism for wheel 52, including gear reducer 70 and electric motor 72, is mounted on the rear leg of frame 38 and is pivoted with that frame. When the frame 38 is in its upper position, this mechanism extends into the area immediately behind rear axle housing 20 which is normally found on automotive vehicles.

The normal sequence of operation of the turntable is as follows: With the turntable frame 38 in its upper position and relatively hidden underneath the vehicle, the vehicle is driven onto the stage or other surface by electric motor 76. When the vehicle reaches the desired position, electrohydraulic system 28 is energized. Hydraulic motors 54 then react against lower frame 38 and pivot it downwardly and forwardly until pad 48 and wheels 50 and 52 engage the stage floor 22. Continued exertion of motors 54 causes the vehicle to be lifted off floor 22 so that the vehicle wheels are clear of the floor. Motor 72 may then be energized to drive wheel 52 through gear reducer 70, causing the vehicle to pivot about the axis of pad 48, as is shown in FIGURE 3. Motor 72 is preferably of the reversible type so that the vehicle may be pivoted in either direction. The vehicle may be pivoted throughout any arc without limitation and may be pivoted any number of complete revolutions if desired. When the vehicle has been shown and it is desired to remove it from the stage, it is pivotally aligned to the direction in which it should exit. Electrohydraulic mechanism 28 is then actuated to cause motors 54 to retract frame 38. At the beginning of the retraction operation, the vehicle will be moved forwardly and downwardly until it is again supported by wheels 16 and 18. Frame 38 will be then pivoted rearwardly and upwardly until it is in the upper or stored position immediately underneath frame 30. The vehicle may then be driven off the stage by energizing motor 76.

A portable turntable having a power unit contained within the vehicle to which the turntable is attached has thus been disclosed which will operate effectively to permit the showing of the vehicle to an audience. The provision of such a turntable eliminates the necessity for providing expensive permanent turntable installations. It further permits the vehicle to be independent of outside power sources. The vehicle may also be driven by the same integral power source as that used for the turntable.

What is claimed is:

Apparatus for showing all sides of a vehicle to an audience, said apparatus including turntable means and drive means integral with said vehicle, said turntable means comprising a first generally triangular frame removably secured to the underside of said vehicle at points adjacent its apexes, a second generally triangular frame pivotally secured to said first frame at points adjacent its apexes, said first and second frame apexes including one pair of said apexes centered beneath said vehicle and forward of the center of gravity thereof and two pairs of said apexes transversely spaced from the center line of said vehicle and rearwardly of the center of gravity thereof, said second frame having a rotary pivot pad with its pivot axis adjacent said pair of forward apexes and a wheel adjacent each of said pair of rear apexes, power drive means mounted on said second frame for driving one of said wheels for pivoting said apparatus and said vehicle about said pivot pad, and power means interconnecting said vehicle and said second frame for lowering and raising said second frame, said vehicle and said apparatus being entirely supported on said pivot pad and said wheels when said second frame is lowered.

References Cited in the file of this patent

UNITED STATES PATENTS

| 982,418 | Ferris | Jan. 24, 1911 |
| 1,953,442 | Sorescu et al. | Apr. 3, 1934 |

FOREIGN PATENTS

| 14,692 | Great Britain | Dec. 29, 1913 |
| 92,868 | Switzerland | Mar. 16, 1922 |